US006229537B1

(12) United States Patent
Sobeski et al.

(10) Patent No.: US 6,229,537 B1
(45) Date of Patent: May 8, 2001

(54) HOSTING WINDOWED OBJECTS IN A NON-WINDOWING ENVIRONMENT

(75) Inventors: David A. Sobeski, Redmond; Felix G. T. I. Andrew; Kate Seekings, both of Seattle, all of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/115,559

(22) Filed: Jul. 15, 1998

(51) Int. Cl.[7] .......... G06F 15/00
(52) U.S. Cl. .......... 345/346; 345/343
(58) Field of Search .......... 707/10, 104; 345/343, 345/346; 703/24

(56) References Cited

U.S. PATENT DOCUMENTS 6,047,318 * 4/2000 Becker et al. .......... 709/217
6,061,721 * 5/2000 Ismael et al. .......... 709/223

OTHER PUBLICATIONS

"Going Native with J/Direct," Accessed Jun. 18, 2000 @ Wysiwyg://22/http.11msdn.microsoft.com/library/welcome/dsmsdn/msdn_drguinat.htm, 16 pages, Nov. 12, 1997.*

Michael Morrison, "Integrating Java and Active X," Java 1.1 Unleashed, Chapter 47, 9 pages, Accessed Jul. 17, 2000 @ http: //hplasim2.univ–lyonl.fr/c.ray/bks/java/htm/ch47.htm, date unknown.*

Jothy Rosenberg, "JAVAX: An Approachable Examination of Java, Java Beans, Java Script and All the Related Java Technologies," JAVAX White Paper, NovaSoft Systems, Inc., 33 pages, Accessed Jun. 18, 2000 @ http://developer-.netscape.com/docs/wpapers/javax/javax.html, Nov. 1997.*

* cited by examiner

*Primary Examiner*—Paul V. Kulik
(74) *Attorney, Agent, or Firm*—Schwegman, Lundberg, Woessner & Kluth, P.A.

(57) ABSTRACT

Hosting windowed objects in a non-windowing environment is disclosed. In one embodiment of the invention, a computerized system includes a non-windowing environment, such as that provided by Java, and a windowed object, such as an ActiveX control. The windowed object is hosted in the non-windowing environment, via, for example, an off-screen parent window such as a Win32 window.

23 Claims, 4 Drawing Sheets

HOSTING WINDOWED OBJECTS IN A NON-WINDOWING ENVIRONMENT

FIELD

This invention relates generally to non-windowing environments, and more particularly to hosting windowed objects in such environments.

BACKGROUND

Graphical user interfaces have become increasingly popular. For example, versions of the Microsoft® Windows® operating system provide for a graphical user interface in which users navigate within the interface via a pointer. Within Windows®, objects such as ActiveX controls are displayed on a screen via associated windows. Microsoft® Windows®, therefore, is a windowing environment in that objects are displayed via host windows, and thus such objects are known as windowed objects, since they require host windows in order to be displayed on the screen.

The Java programming language provides for another graphical user interface. A graphical user interface provided by Java also allows for objects, sometimes known as Java beans, to be displayed within the graphical user interface. However, the user interface provided by Java differs from that provided by the Microsoft® Windows® operating system in that Java does not require objects to have hosting windows for them to be displayed. For example, whereas an ActiveX control in the case of Windows® has a window associated with it, within which the ActiveX control is displayed, Java objects may be displayed directly on the screen, without the use of an associated window. That is, Java objects are non-windowed, and therefore may displayed without the need for a hosting window. Java is therefore a non-windowing environment, in that it does not require the use of a host window to display an object.

This means that the graphical user interface provided by Java does not provide for a manner by which to host windowed objects such as ActiveX controls. That is, because Java does not provide for hosting windows to host objects that require windowing, windowed objects such as ActiveX controls may not be utilized within Java There is a need, therefore, for the hosting of windowed objects such as ActiveX controls within non-windowing environments such as that provided by Java.

SUMMARY

The above-identified problems, shortcomings and disadvantages with the prior art, as well as other problems, shortcoming and disadvantages, are solved by the present invention, which will be understood by reading and studying the specification and the drawings. In one embodiment of the invention, a computerized system includes a non-windowing environment, such as that provided by Java, and a windowed object, such as an ActiveX control. The windowed object is hosted in the non-windowing environment, via, for example, an off-screen parent window such as a Win32 window.

Thus, the invention provides for advantages not found in the prior art. In the specific case where the non-windowing environment is Java and the windowed object is an ActiveX control, the invention provides for the hosting of the ActiveX control within Java. This means that ActiveX controls, which are windowed objects, may be utilized within a non-windowing environment, such as that provided by Java.

The invention includes computerized systems, methods, computers, and computer-readable media of varying scope. Besides the embodiments, advantages and aspects of the invention described here, the invention also includes other embodiments, advantages and aspects, as will become apparent by reading and studying the drawings and the following description.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into six sections. In the first section, the hardware and the operating environment in conjunction with which embodiments of the invention may be practiced are described. In the second section, a computerized system of one embodiment of the invention is presented. In the third section, a computerized method in which a non-windowed object is drawn over a windowed object, in accordance with an embodiment of the invention, is provided. In the fourth section, a computerized method in which a windowed object is drawn over a non-windowed object, in accordance with an embodiment of the invention, is described. In the fifth section, a computerized method in which a parent window is associated with a windowed object for display in a non-windowing environment, according to one embodiment of the invention, is presented. Finally, in the sixth section, a conclusion of the detailed description is provided.

Hardware and Operating Environment

Figure 1:
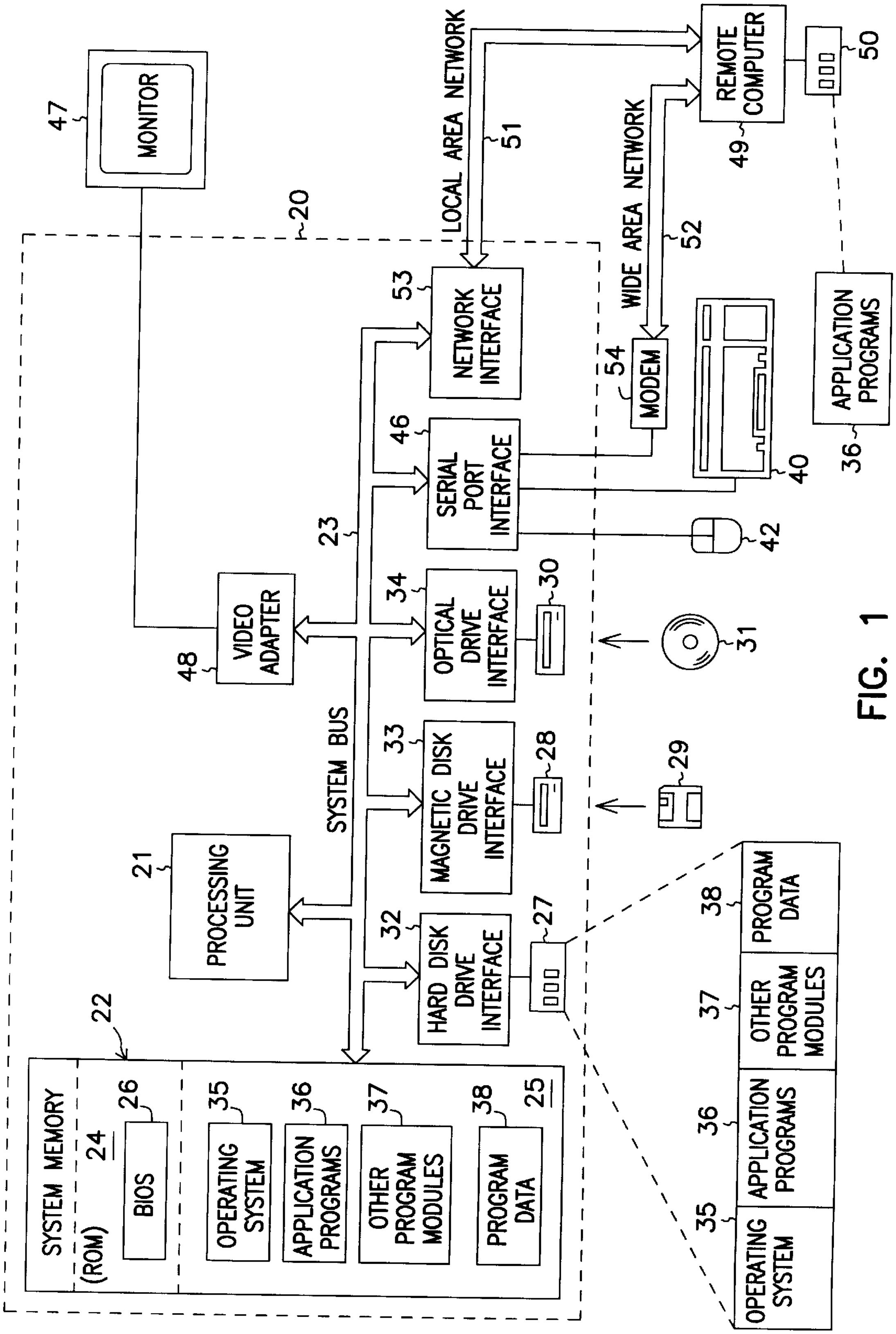
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

Computerized System

In this section of the detailed description, a description of a computerized system according to an embodiment of the invention is provided. The description is provided by reference to FIG. 2. The description is specifically made with reference to hosting ActiveX controls within a Java non-windowing environment, which in one embodiment is accomplished via an associated parent Win32 window.

However, the invention is not so limited; the invention pertains to the hosting of other windowed objects besides ActiveX controls, within other non-windowing environments, besides that provided by Java, as well. The association of a parent window, such as a Win32 window, may also not be required by the invention.

Figure 2:
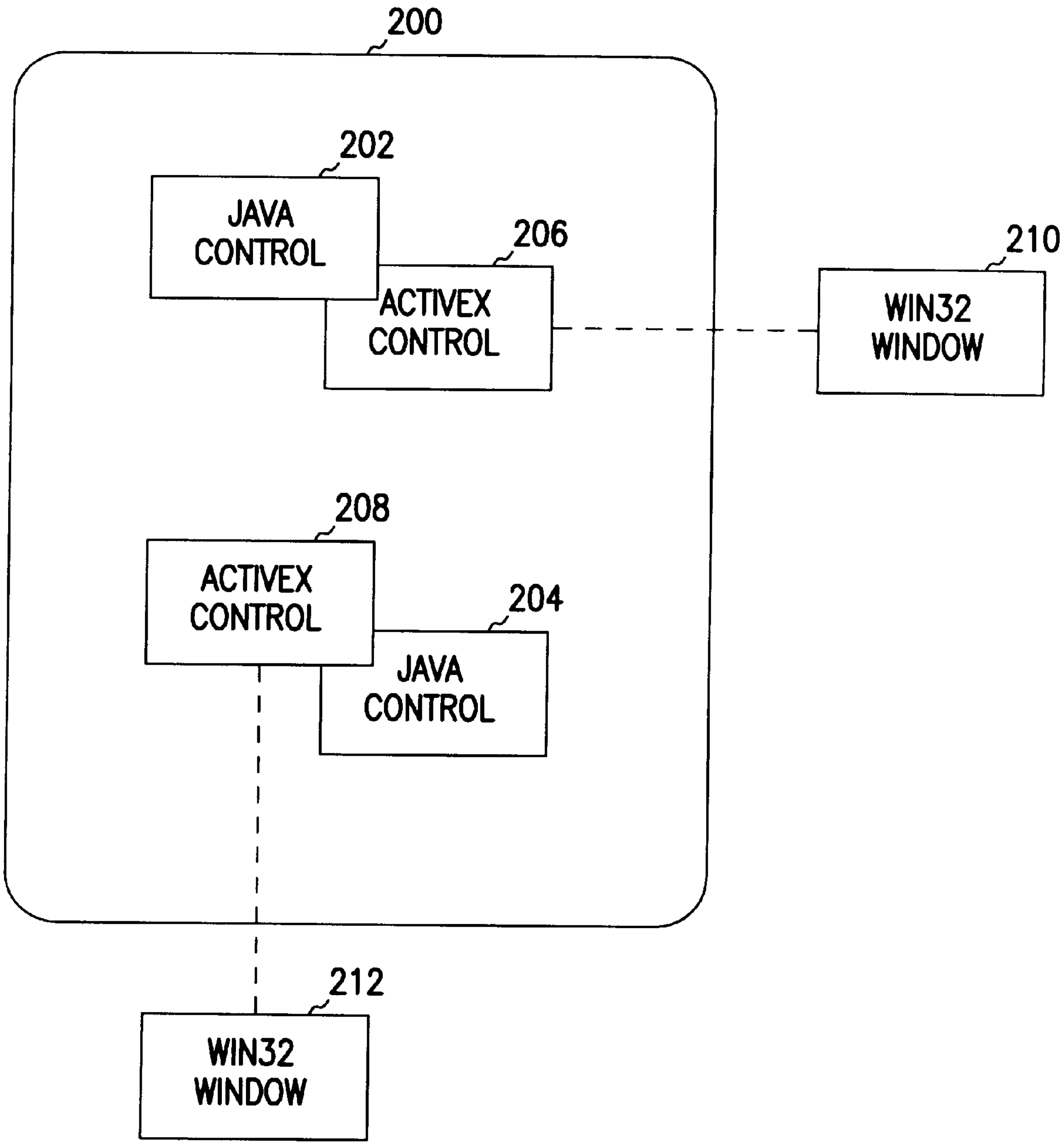
FIG. 2 shows a block diagram of a computerized system according to one embodiment of the invention.

Referring now to FIG. 2, a computerized system according to an embodiment of the invention is shown. The computerized system includes a Java non-windowing environment 200. The Java non-windowing environment 200 is provided by a display system running within the Java virtual machine, for use with the Java programming language. The environment 200 is non-windowing in that objects such as the Java control 202 and the Java control 204 may be displayed within the environment 200 without the use or need for an associated hosting window. The Java control 202 and the Java control 204 are types of non-windowed objects that may be specifically developed for use within the Java non-windowing environment 200. The Java controls are non-windowed in that they do not require an associated hosting window in order to be displayed (hosted) within the non-windowing environment 200.

Conversely, the ActiveX control 206 and the ActiveX control 208 are windowed objects, typically displayed within a graphical user interface provided by versions of the Microsoft® Windows® operating system. As shown in FIG. 2, the Java control 202 overlaps the ActiveX control 206, and the ActiveX control 208 overlaps the Java control 204. The ActiveX controls 206 and 208 are windowed objects in that they each require an associated host window in order to be displayed (hosted) within a non-windowing environment such as the Java non-windowing environment 200 as has been described.

In one embodiment of the invention, this is accomplished by each ActiveX control having an associated Win32 window—the Win32 window 210 in the case of the ActiveX control 206, and the Win32 window 212 in the case of the ActiveX control 208. Each of these Win32 windows is off-screen, such that the windows themselves are not directly displayed within the non-windowing environment 200. Rather, they provide a mechanism by which the windowed objects, the ActiveX control 206 and the ActiveX control 208, may be displayed within the environment 200, as will be described in accordance with a particular embodiment of the invention in the subsequent sections of the detailed description. That is, each of the windows 210 and 212 is an off-screen parent window for a windowed object, so that the windowed object may be hosted in a non-windowing environment.

Thus, the invention as has been described in conjunction with the embodiment of FIG. 2 provides for advantages not found in the prior art. Windowed objects, such as ActiveX controls 206 and 208, that typically cannot be hosted within a non-windowing environment, such as the Java non-windowing environment 200, are made capable of being hosted by the invention, via the Win32 off-screen parent windows 210 and 212. This allows for ActiveX controls to be utilized in non-windowing environments such as that provided by Java.

Computerized Method in Which a Non-Windowed Object Is Drawn Over a Windowed Object In this section of the detailed description, a computerized method in which a non-windowed object is drawn over a windowed object according to an embodiment of the invention is presented. For example, this method is one particular manner, according to one particular embodiment, by which the Java control 202 of FIG. 2 may be drawn over the ActiveX control 206 of the same figure. This description is provided in reference to FIG. 3. The description is specifically made with reference to a non-windowed object that is a Java control, a windowed object that is an ActiveX control, and a non-windowing environment that is provided by Java. However, the invention is not so limited; the invention pertains to other windowed objects, non-windowed objects, and non-windowing environments as well.

The computerized method is desirably realized at least in part as one or more programs running on a computer—that is, as a program executed from a computer-readable medium such as a memory by a processor of a computer. The programs are desirably storable on a computer-readable medium such as a floppy disk or a CD-ROM, for distribution and installation and execution on another (suitably equipped) computer. The programs may be part of a computer program to host a windowed object in a non-windowing environment, for example, via an off-screen parent window for the windowed object.

Figure 3:
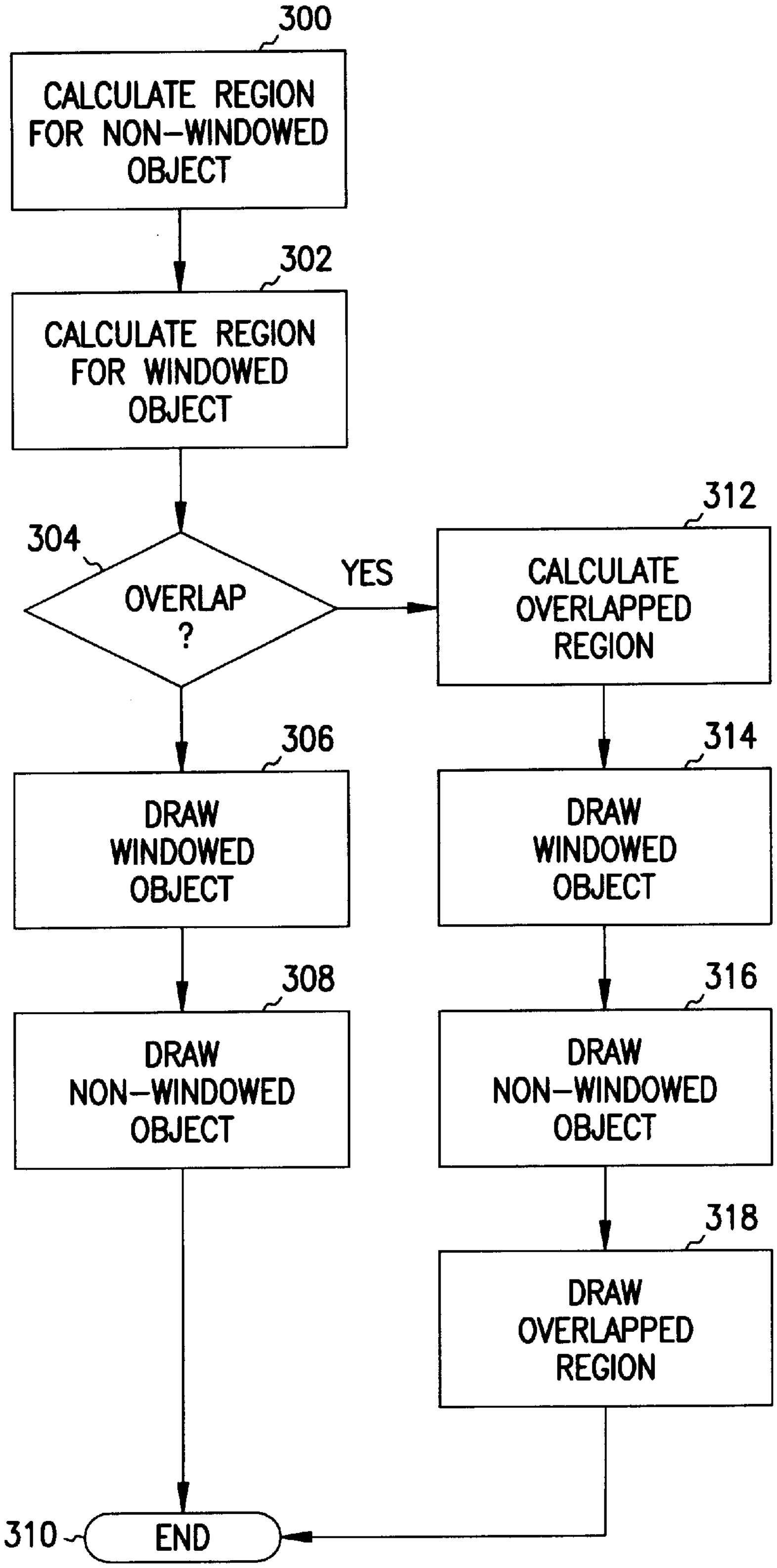
FIG. 3 shows a flowchart illustrating a method in which a non-windowed object may be drawn over a windowed object in a non-windowing environment, according to one embodiment of the invention.

Referring now to FIG. 3, a flowchart of a computerized method according to one embodiment of the invention is shown. In this embodiment, a windowed object is lower in z-order than a non-windowed object. In 300, a region of a display or a screen associated with a first object (control) that is a non-windowed object (specifically, a Java control) is calculated. In 302, a region of the display or the screen associated with a second object (control) that is a windowed object (specifically, an ActiveX control) that is lower in z-order than the first object is calculated.

In 304, it is determined whether the region associated with the first non-windowed object overlaps the region associated with the second windowed object. If there is no overlap, then it is a matter of drawing both objects on the screen or the display: in 306, the windowed object, being lower in z-order than the non-windowed object, is drawn on the screen first, and in 308, the non-windowed object, being higher in z-order than the windowed object, is drawn on the screen last. With respect to drawing the windowed object in 306, this may be accomplished in one embodiment of the invention by associating an off-screen parent window with the windowed object, as is described in a following section of the detailed description. The method ends in step 310.

If in 304 it is determined that the region associated with the first non-windowed object does in fact overlap the region associated with the second windowed object, then in 312 the overlap is calculated. That is, a sub-region of the region of the non-windowed object overlapped by part of the region of the windowed object is calculated and saved. In 314, the windowed object is drawn on the screen or the display first, since it is lower in z-order than the non-windowed object; again, this may be accomplished in one embodiment of the invention by associating an off-screen parent window with the windowed object, as is described in a following section of the detailed description. In 316, the non-windowed object is drawn on the screen or the display.

In 318, the overlapped region between the windowed object and the non-windowed object is again drawn, since the lower, windowed object may not recognize its being lower in z-order priority than the higher, non-windowed object. That is, the windowed object only relates to and takes into account overlapping with other objects that are also windowed; it does not take into account objects that are non-windowed, and therefore may try to reassert itself over the non-windowed object, even though it is in fact of lower priority than the non-windowed object.

Therefore, the overlapped region is again drawn, which is accomplished by overriding the drawing of the region of the windowed object that is overlapped by the region of the non-windowed object, and drawing the overlapped sub-region as previously saved in 312. The acts and/or steps of 312 and 318 constitute processing a sub-region of the region associated with the non-windowed object overlapping the region associated with the windowed object. The method again ends in 310.

Computerized Method in Which a Windowed Object Is Drawn Over a Non-Windowed Object In this section of the detailed description, a computerized method in which a windowed object is drawn over a non-windowed object according to an embodiment of the invention is presented. For example, this method is one particular manner, according to one particular embodiment, by which the ActiveX control 208 of FIG. 2 may be drawn over the Java control 204 of the same figure. This description is provided in reference to FIG. 4. The description is specifically made with reference to a non-windowed object that is a Java control, a windowed object that is an ActiveX control, and a non-windowing environment that is provided by Java. However, the invention is not so limited; the invention pertains to other windowed objects, non-windowed objects, and non-windowing environments as well.

The computerized method is desirably realized at least in part as one or more programs running on a computer—that is, as a program executed from a computer-readable medium such as a memory by a processor of a computer. The programs are desirably storable on a computer-readable medium such as a floppy disk or a CD-ROM, for distribution and installation and execution on another (suitably equipped) computer. The programs may be part of a computer program to host a windowed object in a non-windowing environment, for example, via an off-screen parent window for the windowed object.

Figure 4:
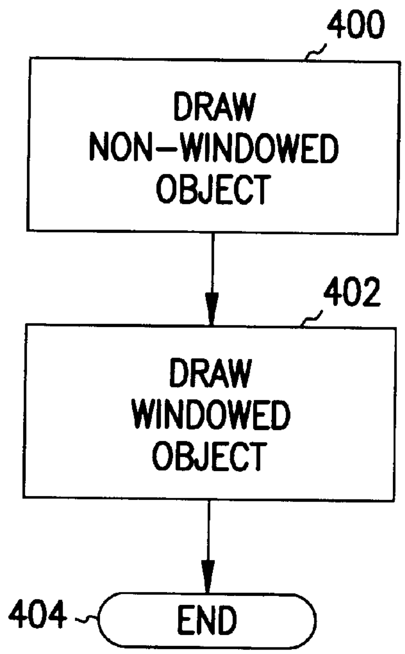
FIG. 4 shows a flowchart illustrating a method in which a windowed object may be drawn over a non-windowed object in a non-windowing environment, according to one embodiment of the invention; and, FIG. 5 shows a flowchart illustrating a method in which a parent window is associated with a windowed object for display in a non-windowing environment, according to one embodiment of the invention.

Referring now to FIG. 4, a flowchart of a computerized method according to one embodiment of the invention is shown. In this embodiment, a non-windowed object is lower in z-order than a windowed object. That is, if the windowed object overlaps the non-windowed object, the windowed object takes priority, because it is higher in z-order than the non-windowed object (i.e., it is on top of the non-windowed object).

In 400, the non-windowed object, being lower in z-order than the windowed object, is drawn on the screen or the display first. That is, a region associated with a non-windowed object such as a Java control is drawn. In 402, the windowed object, being higher in z-order than the non-windowed object, is drawn on the screen or the display last. That is, a region associated with a windowed object such as an ActiveX control is drawn. With respect to drawing the windowed object in 402, this may be accomplished in one embodiment of the invention by associating an off-screen parent window with the windowed object, as is described in a following section of the detailed description. The method ends in step 404.

The embodiment of FIG. 4 does not need to take into specific account overlap between the windowed and the non-windowed objects (viz., regions thereof) as was done in the embodiment of FIG. 3 described in the previous section of the detailed description, because it is acceptable for the windowed object to assert priority over the non-windowed object, since it is in fact higher in z-order priority than the non-windowed object. Thus, while in the embodiment of FIG. 3 the overlapped region may have to be redrawn since the windowed object may reassert priority when it in fact has lower z-order priority than the non-windowed object, this is not an issue in the embodiment of FIG. 4, where the windowed object does in fact have z-order priority over the non-windowed object, and thus may reassert such priority.

Computerized Method in Which a Parent Window Is Associated With a Windowed Object for Display in a Non-Windowing Environment In this section of the detailed description, a computerized method in which a parent window is associated with a windowed object so that the object may be hosted within a non-windowing environment is described, according to one embodiment of the invention. For example, this method is one particular manner, according to one particular embodiment, by which the ActiveX controls 206 and 208 of FIG. 2 may be drawn within the Java non-windowing environment 200 of the same figure. This method accomplishes this by associating the off-screen parent Win32 window 210 with the ActiveX control 206, and the off-screen parent Win32 window 212 with the ActiveX control 208, all of FIG. 2.

Figure 5:
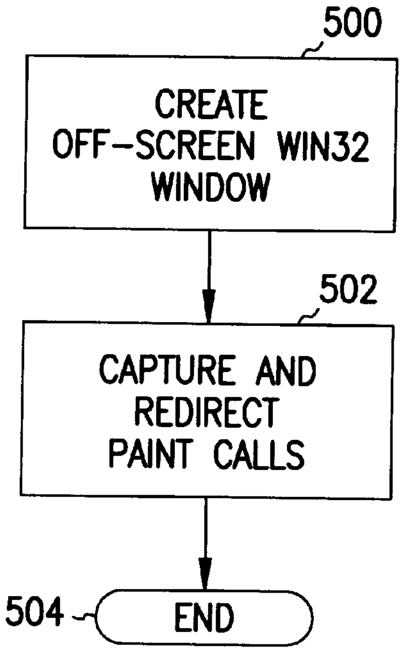

This description is provided in reference to FIG. 5. The description is specifically made with reference to a windowed object that is an ActiveX control, a parent window that is a Win32 window, as known within the art, and a non-windowing environment that is provided by Java. However, the invention is not so limited; the invention pertains to other windowed objects, non-windowing environments, and parent windows as well. Furthermore, this section describing the embodiment of FIG. 5 is only a particular manner by which windowed objects may be specifically drawn within a non-windowing environment, as this section has been referred to by the previous sections of the detailed description. Other manners by which windowed objects may be drawn within a non-windowing environment, relating to other embodiments of the invention, are also amenable to the invention.

The computerized method is desirably realized at least in part as one or more programs running on a computer—that is, as a program executed from a computer-readable medium such as a memory by a processor of a computer. The programs are desirably storable on a computer-readable medium such as a floppy disk or a CD-ROM, for distribution and installation and execution on another (suitably equipped) computer. The programs may be part of a computer program to host a windowed object in a non-windowing environment, for example, via an off-screen parent window for the windowed object.

Referring now to FIG. 5, in 500, an off-screen Win32 parent window is created and associated with the windowed object (e.g., an ActiveX control). This is because ActiveX controls, as windowed objects, require a parent window in order to be displayed on a display or a screen. Since the window manager of Java is in fact windowless—hence Java being a non-windowing environment not requiring windows for the display of objects—this off-screen Win32 parent window must be generated dynamically when a windowed object is created and hosted within a non-windowing environment. However, the Win32 parent window in 500 is not drawn on-screen, but rather is created in memory off-screen, such that it is hidden. Thus, calls made to and by the parent window do not result in immediate drawing on the display or screen, but rather result in "drawing" in a part of memory not related to the display or screen (i.e., off-screen).

Thus, in 502, paint (drawing) calls relating to the Win32 parent window are captured, and redirected to the appropriate part of memory relating to the display or the screen. Put another way, the paint calls relating to a region of a windowed object such as an ActiveX control are captured, and redirected on-screen as necessary and as appropriate. This allows for the management of a region associated with a windowed object overlapping a region associated with a non-windowed object, and vice-versa, as has been described in previous sections of the detailed description. In particular, this allows for the proper drawing of the sub-region of a region associated with a non-windowed object when it overlaps a part of a region associated with a windowed object, as has been described in previous sections of the detailed description.

When a user interacts with the windowed object, the parent window for which is actually off-screen, all Win32 input messages are created and passed on to the windowed object dynamically. This means that the Java window manager, in the case of a Java non-windowing environment, creates notifications such as focus and mouse messages, for example, which are then coalesced into Win32 messages and handed to the Win32 window that is located off-screen. Thus, by locating the Win32 window off-screen, double-buffering and optimal drawing of the non-windowed objects (e.g., the Java objects), is possible, and those of ordinary skill within the art can appreciate.

Conclusion

Hosting windowed objects in a non-windowing environment has been described. In particular the hosting of an ActiveX control in a Java non-windowing environment has been presented. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computerized system comprising:

a non-windowing environment;

an off-screen parent window: and, a windowed object displayed in the non-windowing environment via the off-screen parent window.

2. The computerized system of claim 1, wherein the off-screen parent window comprises a Win32 window.

3. The computerized system of claim 1, further comprising a non-windowed object displayed in the non-windowing environment.

4. The computerized system of claim 3, wherein the non-windowed object overlaps the windowed object.

5. The computerized system of claim 3, wherein the windowed object overlaps the non-windowed object.

6. The computerized system of claim 1, wherein the non-windowing environment comprises a Java environment.

7. The computerized system of claim 1, wherein the windowed object comprises an ActiveX control.

8. A computerized system comprising:

a Java non-windowing environment;

an off-screen parent Win32 window; and, an ActiveX control displayed in the Java non-windowing environment via the off-screen parent Win32 window.

9. A computerized method comprising:

drawing a first region, the first region associated with a first control selected from the group essentially consisting of a Java control and an ActiveX control;

drawing a second region higher in z-order than the first region, the second region associated with a second control selected from the group essentially consisting of a Java control and an ActiveX control, wherein at least one of the first control and the second control is an ActiveX control; and associating an off-screen parent window with each ActiveX control.

10. The computerized method of claim 9, further comprising:

determining whether the first region is associated with an ActiveX control;

determining whether the second region overlaps the first region; and, upon determining that the first region is associated with an ActiveX control and the second region overlaps the first region, processing a sub-region of the second region overlapping the first region.

11. The computerized method of claim 10, wherein processing the sub-region comprises:

saving the sub-region of the second region overlapping the first region;

overriding drawing of the first region as overlapped by the sub-region of the second region; and, drawing the sub-region of the second region.

12. The computerized method of claim 9, further comprising:

determining whether the first region is associated with an ActiveX control; and, upon determining that the first region is associated with an ActiveX control, associating an off-screen parent window with the ActiveX control.

13. The computerized method of claim 12, wherein drawing the first region comprises:

capturing paint calls of the first region; and, redirecting the calls on-screen as necessary.

14. The computerized method of claim 9, further comprising:

determining whether the second region is associated with an ActiveX control; and, upon determining that the second region is associated with an ActiveX control, associating an off-screen parent window with the ActiveX control.

15. The computerized method of claim 14, wherein drawing the second region comprises:

capturing paint calls of the second region; and, redirecting the calls on-screen as necessary.

16. A computer comprising:

a processor;

a computer-readable medium;

a computer program executed by the processor from the medium to display a windowed object in a non-windowing environment via an off-screen parent window for the windowed object.

17. The computer of claim 16, wherein the windowed object comprises an ActiveX control, the non-windowing environment comprises a Java environment, and the off-screen parent window comprises a Win32 window.

18. A computer-readable medium having a computer program stored thereon for execution on a computer, the computer program to display a windowed object in a non-windowing environment via an off-screen parent window for the windowed object.

19. The computer-readable medium of claim 18, wherein the windowed object comprises an ActiveX control, the non-windowing environment comprises a Java environment, and the off-screen parent window comprises a Win32 window.

20. A computer readable medium having instructions for causing a computer to implement a method comprising:

drawing a first region, the first region associated with a first control selected from the group essentially consisting of a Java control and an ActiveX control;

drawing a second region higher in z-order than the first region, the second region associated with a second control selected from the group essentially consisting of a Java control and an ActiveX control, wherein at least one of the first control and the second control is an ActiveX control; and associating an off-screen parent window with each ActiveX control.

21. The computer readable medium of claim 20 having instructions for causing the computer to implement the method further comprising:

determining whether the first region is associated with an ActiveX control;

determining whether the second region overlaps the first region; and, upon determining that the first region is associated with an ActiveX control and the second region overlaps the first region, processing a sub-region of the second region overlapping the first region.

22. The computer readable medium of claim 21, wherein processing the sub-region comprises:

saving the sub-region of the second region overlapping the first region;

overriding drawing of the first region as overlapped by the sub-region of the second region; and, drawing the sub-region of the second region.

23. The computer readable medium of claim 22, wherein drawing the second region comprises:

capturing paint calls of the second region; and, redirecting the calls on-screen as necessary.

* * * * *

UNITED STATES PATENT AND TRADEMARK OFFICE
CERTIFICATE OF CORRECTION

PATENT NO. : 6,229,537 B1
DATED : May 8, 2001
INVENTOR(S) : Sobeski et al.

It is certified that error appears in the above-identified patent and that said Letters Patent is hereby corrected as shown below:

Column 1,
Lines 33-34, "may displayed" should read -- may be displayed --
Line 42, "Java There" should read -- Java. There --

Column 3,
Line 25, "include" should read -- including --

Column 9,
Line 46, "window:" should read -- window; --

Signed and Sealed this

Eighteenth Day of December, 2001

*Attest:*

JAMES E. ROGAN
*Director of the United States Patent and Trademark Office*

*Attesting Officer*